(12) United States Patent
DiBona et al.

(10) Patent No.: US 10,599,862 B2
(45) Date of Patent: *Mar. 24, 2020

(54) WEARABLE DEVICE MULTI-MODE SYSTEM

(71) Applicant: Google LLC, Mountain View, CA (US)

(72) Inventors: Christopher James DiBona, Mountain View, CA (US); Daniel Lawrence Morrill, Mountain View, CA (US); Daniel Berlin, Potomac, MD (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/376,070

(22) Filed: Apr. 5, 2019

(65) Prior Publication Data
US 2019/0228175 A1  Jul. 25, 2019

Related U.S. Application Data

(63) Continuation of application No. 15/420,931, filed on Jan. 31, 2017, now Pat. No. 10,296,758, which is a
(Continued)

(51) Int. Cl.
*G06F 7/04* (2006.01)
*G06F 12/00* (2006.01)
(Continued)

(52) U.S. Cl.
CPC ......... *G06F 21/6218* (2013.01); *G06F 21/31* (2013.01); *G06F 21/60* (2013.01); *G06Q 10/00* (2013.01); *G06F 3/014* (2013.01)

(58) Field of Classification Search
CPC ...... G06F 21/6218; G06F 21/60; G06F 21/31; G06F 3/014; G06Q 10/00
See application file for complete search history.

(56) References Cited

U.S. PATENT DOCUMENTS 4,941,236 A   7/1990  Sherman et al.
6,219,694 B1  4/2001  Lazaridis et al.
(Continued)

FOREIGN PATENT DOCUMENTS

CN   101379805 A   3/2009
CN   102111494 A   6/2011
(Continued)

OTHER PUBLICATIONS

Ojala et al.,"Wearable Authentication Device for Transparent Login in Nomadic Applications Environment", 2008 International Conference on Signals, Circuitsand Systems, 2008.
(Continued)

*Primary Examiner* — Trong H Nguyen
(74) *Attorney, Agent, or Firm* — Lerner, David, Littenberg, Krumholz & Mentlik, LLP

(57) ABSTRACT

Systems and techniques are disclosed for detecting whether a wearable computing device is worn by a user or not. The detection can be made based on whether the device is secured to a user or based on a sensor. A device worn by a user may be operated in a private mode such that the user wearing the device is provided information that is useful while wearing the device. For example, the user may receive message notifications, news updates, telephone call information, or the like. A wearable computing device maybe operated in a public mode while not being worn by a user. While in the public mode, the device may provide non user specific information such as a current time, media items, or the like.

22 Claims, 8 Drawing Sheets

Related U.S. Application Data continuation of application No. 13/914,875, filed on Jun. 11, 2013, now Pat. No. 9,569,625.

(51) Int. Cl.

| | | |
|---|---|---|
| *G06F 12/14* | (2006.01) | |
| *G06F 13/00* | (2006.01) | |
| *G06F 17/30* | (2006.01) | |
| *G11C 7/00* | (2006.01) | |
| *G06F 21/62* | (2013.01) | |
| *G06F 21/60* | (2013.01) | |
| *G06F 21/31* | (2013.01) | |
| *G06Q 10/00* | (2012.01) | |
| *G06F 3/01* | (2006.01) | |

(56) References Cited

U.S. PATENT DOCUMENTS

| | | |
|---|---|---|
| 6,703,918 B1 | 3/2004 | Kita |
| 6,774,796 B2 | 8/2004 | Smith |
| 6,937,135 B2 | 8/2005 | Kitson et al. |
| 7,571,468 B1 | 8/2009 | Williams |
| 7,711,961 B2 | 5/2010 | Fujinuma et al. |
| 8,279,716 B1 | 10/2012 | Gossweiler, III et al. |
| 2003/0046228 A1 | 3/2003 | Berney |
| 2003/0184430 A1 | 10/2003 | Kumar |
| 2006/0288233 A1 | 12/2006 | Kozlay |
| 2007/0050618 A1* | 3/2007 | Roux .............. H04L 9/321 713/155 |
| 2007/0076897 A1 | 4/2007 | Philipp |
| 2008/0034217 A1 | 2/2008 | McQuaide |
| 2008/0288299 A1 | 11/2008 | Schultz |
| 2008/0318636 A1 | 12/2008 | Kim |
| 2009/0041313 A1 | 2/2009 | Brown |
| 2011/0059769 A1 | 3/2011 | Brunolli |
| 2011/0159864 A1 | 6/2011 | Park et al. |
| 2011/0206285 A1 | 8/2011 | Hodge et al. |
| 2011/0252243 A1 | 10/2011 | Brouwer et al. |
| 2012/0215115 A1 | 8/2012 | Takahashi |
| 2012/0316777 A1 | 12/2012 | Kitta |
| 2014/0049487 A1* | 2/2014 | Konertz .............. G06F 3/041 345/173 |
| 2015/0161371 A1* | 6/2015 | Hoshi .............. G06F 21/35 726/19 |
| 2016/0037345 A1* | 2/2016 | Margadoudakis .. H04L 63/0853 455/411 |
| 2016/0037346 A1* | 2/2016 | Boettcher ......... H04M 1/72519 455/411 |

FOREIGN PATENT DOCUMENTS

| | | |
|---|---|---|
| EP | 1983732 A1 | 10/2008 |
| WO | 2010033944 A2 | 3/2010 |

OTHER PUBLICATIONS

International Search Report and Written Opinion dated Oct. 22, 2014 for Application No. PCT/US2014/41688.
Preliminary Report and Written Opinion for PCT application PCT/US2014/041688 dated Dec. 23 , 2015.
Notification of the First Office Action dated Mar. 7, 2018, for Chinese Patent Application No. 201480041143.5.

* cited by examiner

WEARABLE DEVICE MULTI-MODE SYSTEM

CROSS-REFERENCE TO RELATED APPLICATIONS

This application is a continuation of U.S. application Ser. No. 15/420,931, filed on Jan. 31, 2017, which is a continuation of U.S. application Ser. No. 13/914,875, filed on Jun. 11, 2013, and issued as U.S. Pat. No. 9,569,625 on Feb. 14, 2017, the disclosure of which are incorporated herein by reference.

BACKGROUND

Traditional wearable devices, such as wrist watches, eyewear, and the like, are limited in space and size, resulting in a low number of buttons and/or a restricted surface area that a user can interact with. The limited space and size may restrict the capability of a wearable device and/or require a user to shift through multiple menus to accomplish a task, such as to modify a device state. Accordingly, a user may be less motivated to use a wearable device as use of the device would require the user to maneuver through an unacceptable number of menus or to operate a device that is cumbersome difficult to use. Additionally, a wearable device may operate via battery power and may generally operate in a single state. Based on operating in the single state, the device may lose battery power at the same rate whether or not the device is worn by a user, effectively wasting the lost battery power.

BRIEF SUMMARY

According to implementations of the disclosed subject matter, a wearable computing device may be detected as worn by a user and, based on the detection, the wearable computing device may operate in a private mode in which one or more private data elements are provided to the user, which are not available when the device is not in the private mode. The wearable computing device may be detected as not worn by a user and, based on the detection, the wearable computing device may operate in a public mode in which the device provides one or more data elements that are not secure, and in which it may not provide private data elements. An electronic device such as a mobile phone, tablet, laptop computer, desktop computer, server, hard drive, or the like may provide the private data element to the wearable electronic device. The electronic device may also determine whether a data element is a private data element or a public data element. Alternatively, the wearable computing device may determine whether a data element is a private data element or a public data element. Whether a wearable computing device is worn by a user or not may be determined by detecting whether a securable portion of the wearable computing device, such as a clasp, buckle, or fastener is secured. Alternatively, a capacitance, conductance, galvanic skin response, accelerometer, heartbeat monitor, or a device with a microprocessor may be used to make the determination.

Systems and techniques according to the present disclosure allow the arrangement to determine whether to operate a wearable device in a private or public mode based on whether it is determined that the device is being worn by a user, or likely to be worn by a user. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
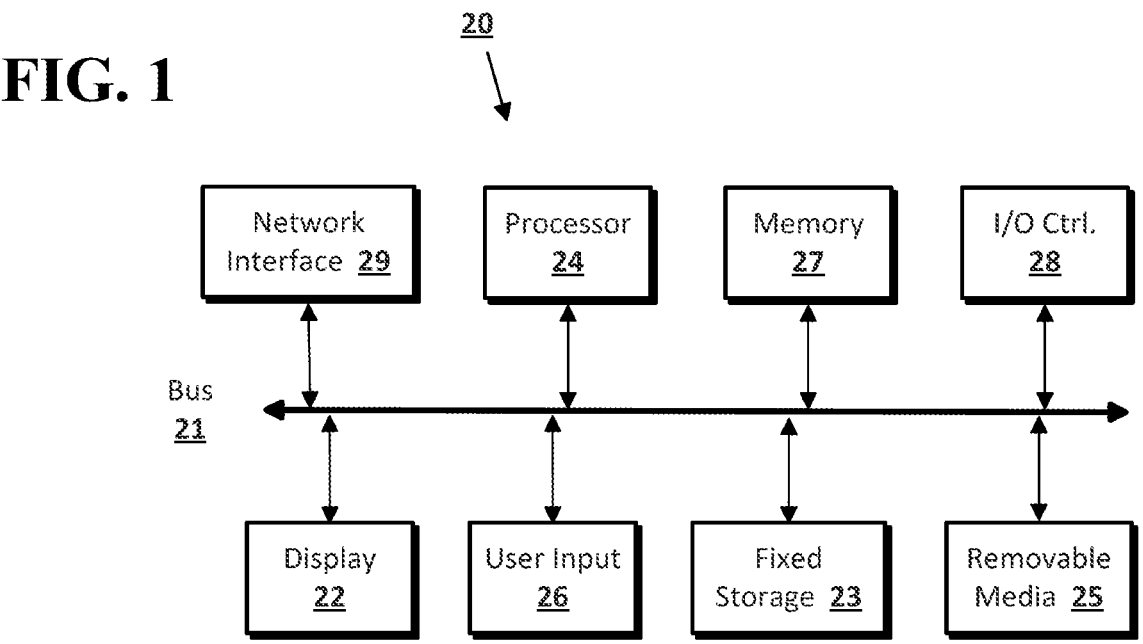
FIG. 1 shows a computer according to an implementation of the disclosed subject matter.

Enabling a wearable computing device to automatically modify a use mode can improve device battery life, allow secured data distribution, allow personalized data distribution, and have additional benefits as disclosed herein. According to implementations disclosed herein, whether the device is being worn by a user, or likely to be worn by a user may be based on a secured clasp, buckle, fastener or based on measuring a capacitance, capacitance, galvanic skin response, or any other applicable technique. The arrangement may operate the wearable computing device in a private mode if the device is determined to likely be worn by a user. As disclosed herein, the private mode operation may include configurations and specific data disclosure such as providing a user with email messages that are associated with a user email account. It may be beneficial to operate a wearable computing device in a different mode while the device is worn (i.e. private mode) than while the device is not worn (i.e., public mode). Using different modes when appropriate may enable efficient battery consumption. For example, more data may be received and/or transmitted by the wearable computing device while it is in a private mode as a user may benefit from the data transfer. As another example, more information may be displayed on the wearable computing device display when in a private mode, because it is more likely that a user wearing the device will receive the information. As another example, the wearable computing device display may be brighter when the device is in a private mode as a user is more likely to view the display, and save battery power by operating at a different brightness when in the public mode. Using different modes also may secure private data, for example by only displaying private data while in a private mode. As another example, communication with another electronic device may vary based on private and public modes. The use of multiple modes as disclosed herein also may provide personal data. For example, user specific data may be received and provided to a user in the private mode, the wearable computing device may communicate with a specific user electronic device based on the operating in a private mode and the user wearing the device, etc.

A user may be authenticated prior to operating the wearable computing device in a private mode by using techniques disclosed herein such as inputting a pin-code, providing biometric data, and the like. The arrangement may operate the wearable computing device in a public mode if the device is determined to not be worn by a user or not likely to be worn by a user. As disclosed herein, the public mode operation may include configurations and general data disclosure such as allowing media playback from the wearable computing device or displaying a current time on the device display. As a specific example, a wrist watch with a display screen may operate in a public mode while unclasped and placed inside a cupboard. While in the public mode, the watch may operate at 10% brightness and display a current time. Subsequently, the watch may be extracted from the cupboard and secured on a user's wrist by placing the watch around the user's wrist and securing it by clasping the watch band. The arrangement may determine that the user is wearing the wrist watch and require the user to input a pin-code in order to operate the wrist watch in a private mode. Receiving an incorrect pin-code may result in continued operation of the wrist watch in the public mode. Receiving a correct pin-code may result in operating the wrist watch in a private mode such that the user is able to receive personalized information such as emails and/or interact with the wrist watch in a manner that is distinct from interaction with the wrist watch while it operates in the public mode.

Implementations of the presently disclosed subject matter may be implemented in and used with a variety of component and network architectures. FIG. 1 is an example computer 20 suitable for implementing implementations of the presently disclosed subject matter. The computer 20 may correspond to a wearable computing device or may be a part of the wearable computing device. The computer 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces, such as an electronic device, as disclosed herein. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
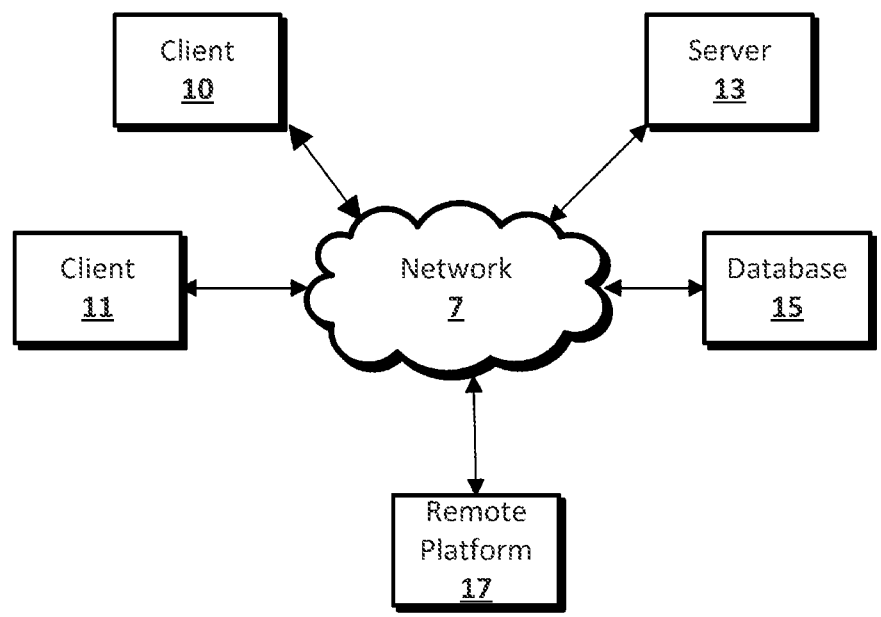
FIG. 2 shows a network configuration according to an implementation of the disclosed subject matter.

FIG. 2 shows an example network arrangement according to an implementation of the disclosed subject matter. One or more clients 10, 11, such as wearable computing devices, local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3:
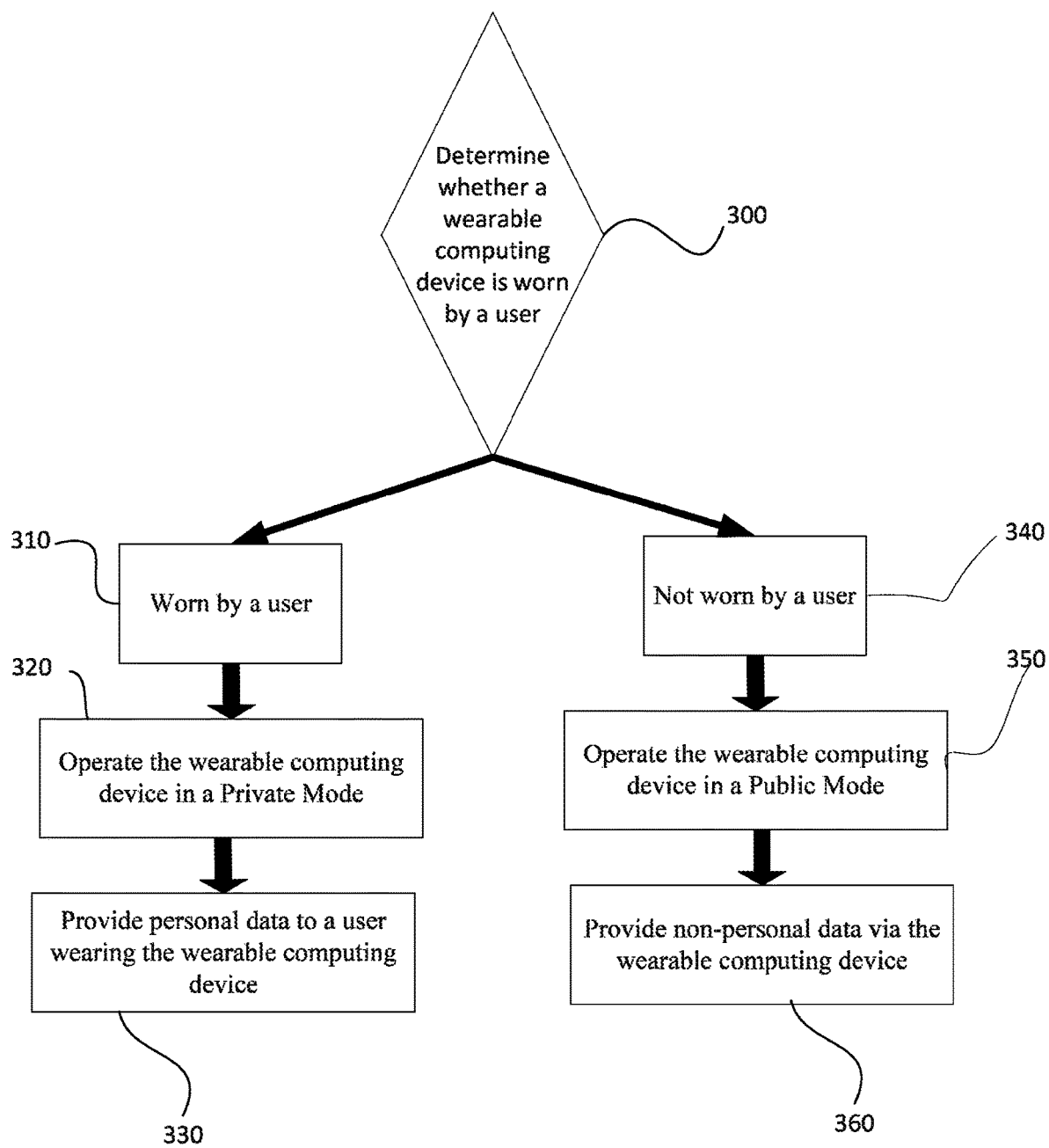
FIG. 3 shows an example process for determining an operation mode, according to an implementation of the disclosed subject matter.

According to an implementation of the disclosed subject matter, as shown at step 300 in FIG. 3, the arrangement may determine whether a wearable computing device is worn by a user or likely worn by a user. Determining whether a wearable computing device is worn or likely worn by a user may enable the arrangement to operate the device in a respective mode. For example, a private mode configured to drive a display on the wearable computing device at 100% brightness may be suitable while the device is worn and, accordingly, determining that the device is worn may result in operating the device in the private mode.

Figure 4A:
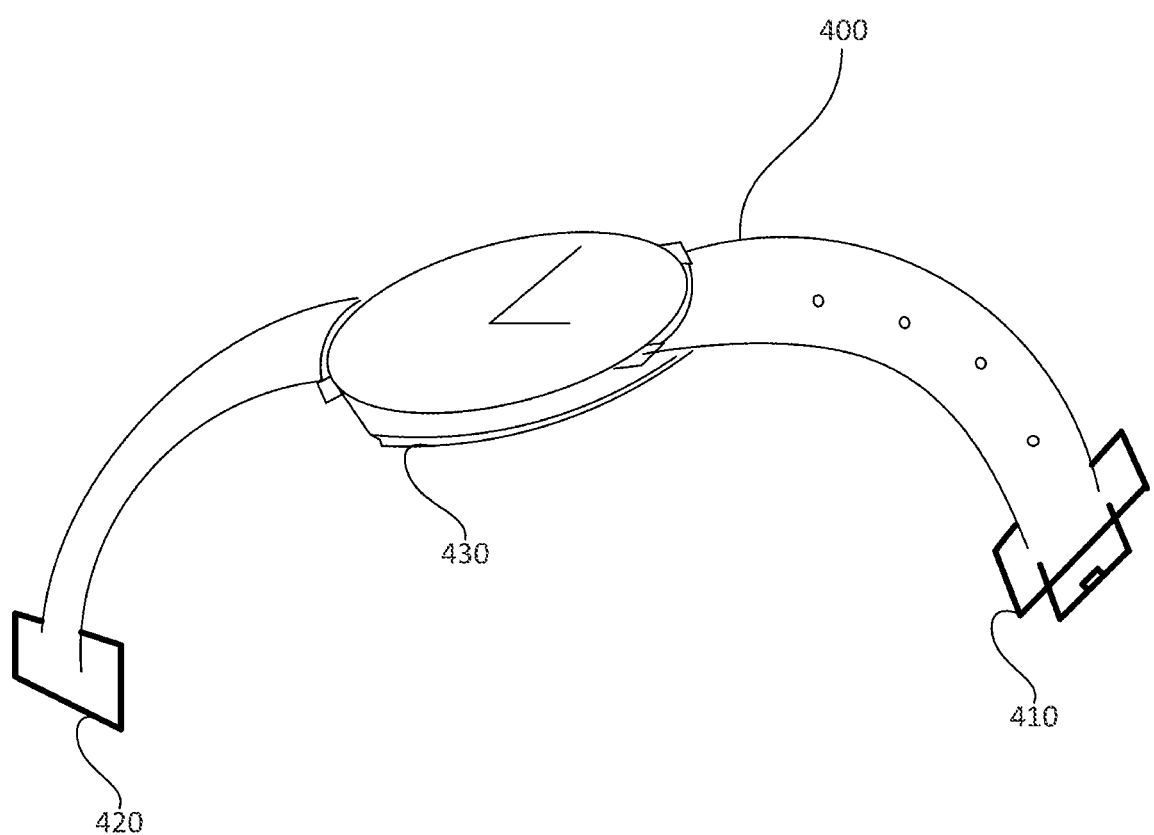
FIG. 4a shows an example illustration of a wearable unclasped watch, according to an implementation of the disclosed subject matter.
Figure 4B:
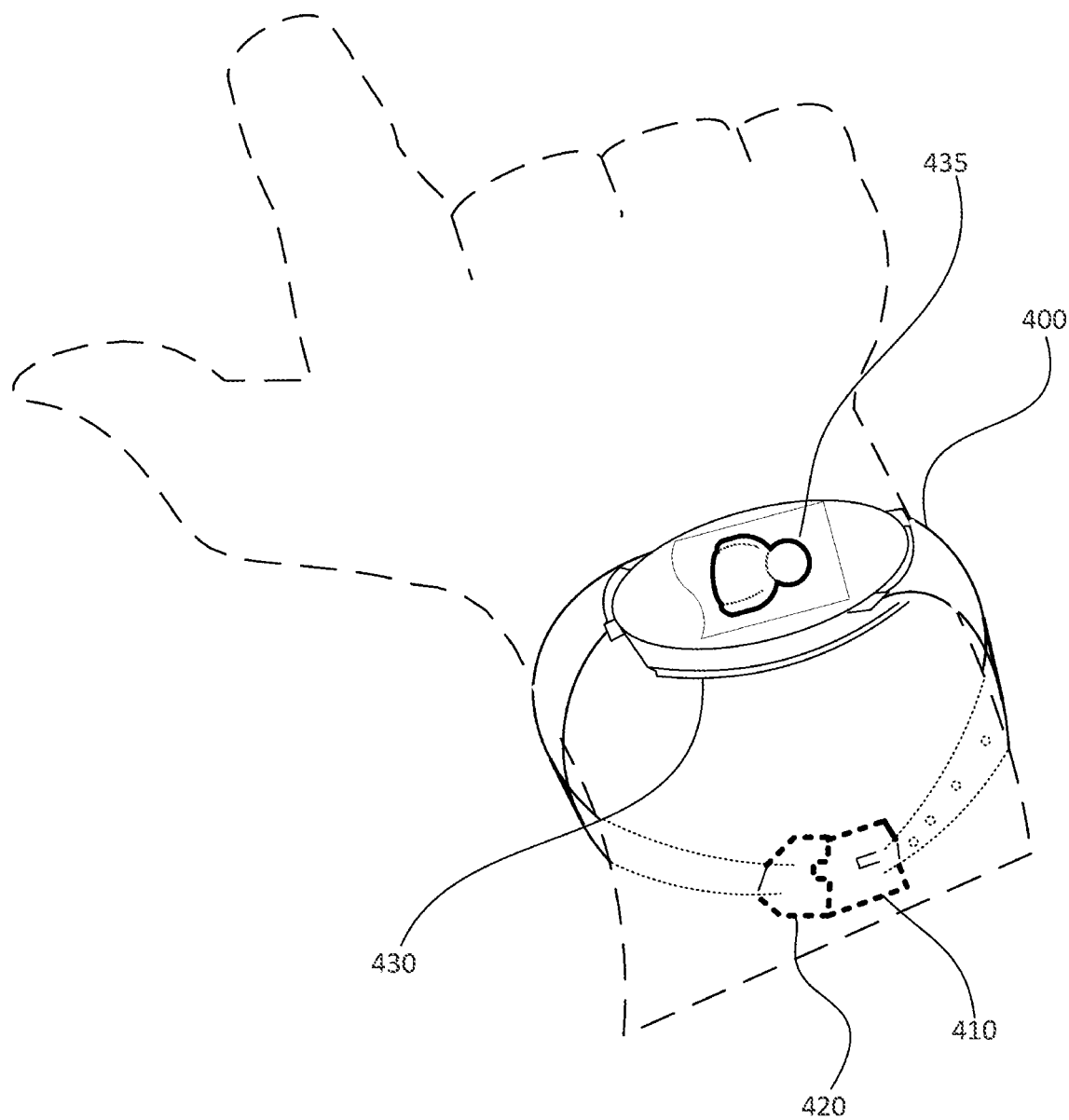
FIG. 4b shows an example illustration of a wearable clasped watch, according to an implementation of the disclosed subject matter.

A wearable computing device may be designated as worn or likely worn by a user based on whether a securable component of the device is secured. The securable component may be any applicable component such as a clasp, a buckle, a fastener, or the like. For example, as shown in FIG. 4a, a wrist watch 400 may contain two fastening components, a first clasp component 410 and a second clasp component 420. The arrangement may determine that the wrist watch is not worn or not likely worn by a user while the first clasp component 410 and the second clasp component 420 are not connected. A connection may be determined based on an electronic signal that propagates through at least a portion of the wearable computing device. Continuing the previous example, an electronic signal may be propagated towards one end of the wrist watch such that a circuit is not complete unless the first clasp component 410 and second clasp component 420 are connected. Accordingly, the arrangement may determine that the wrist watch is not worn or not likely not worn by a user if it detects that the circuit is not completed. Alternatively, as shown in FIG. 4b, the wrist watch 400 may be worn by a user and secured by connecting the first clasp component 410 and second clasp component 420. An electric circuit may be completed when the clasps are connected and, accordingly, the arrangement may determine that the wrist watch is worn by a user. It will be understood that although a completed circuit is specifically disclosed as an example, any applicable signal detection may be utilized to establish the state of a wearable computing device.

Figure 5:
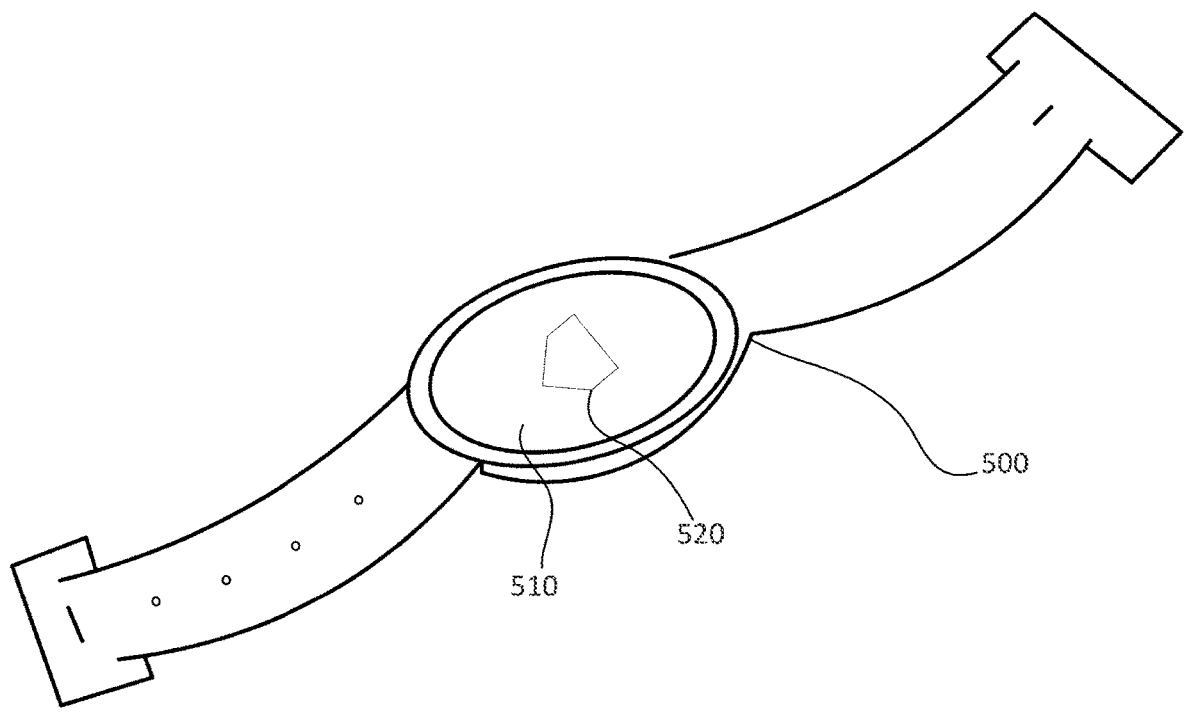
FIG. 5 shows an example illustration of the reverse side of a watch, according to an implementation of the disclosed subject matter.
Figure 7:
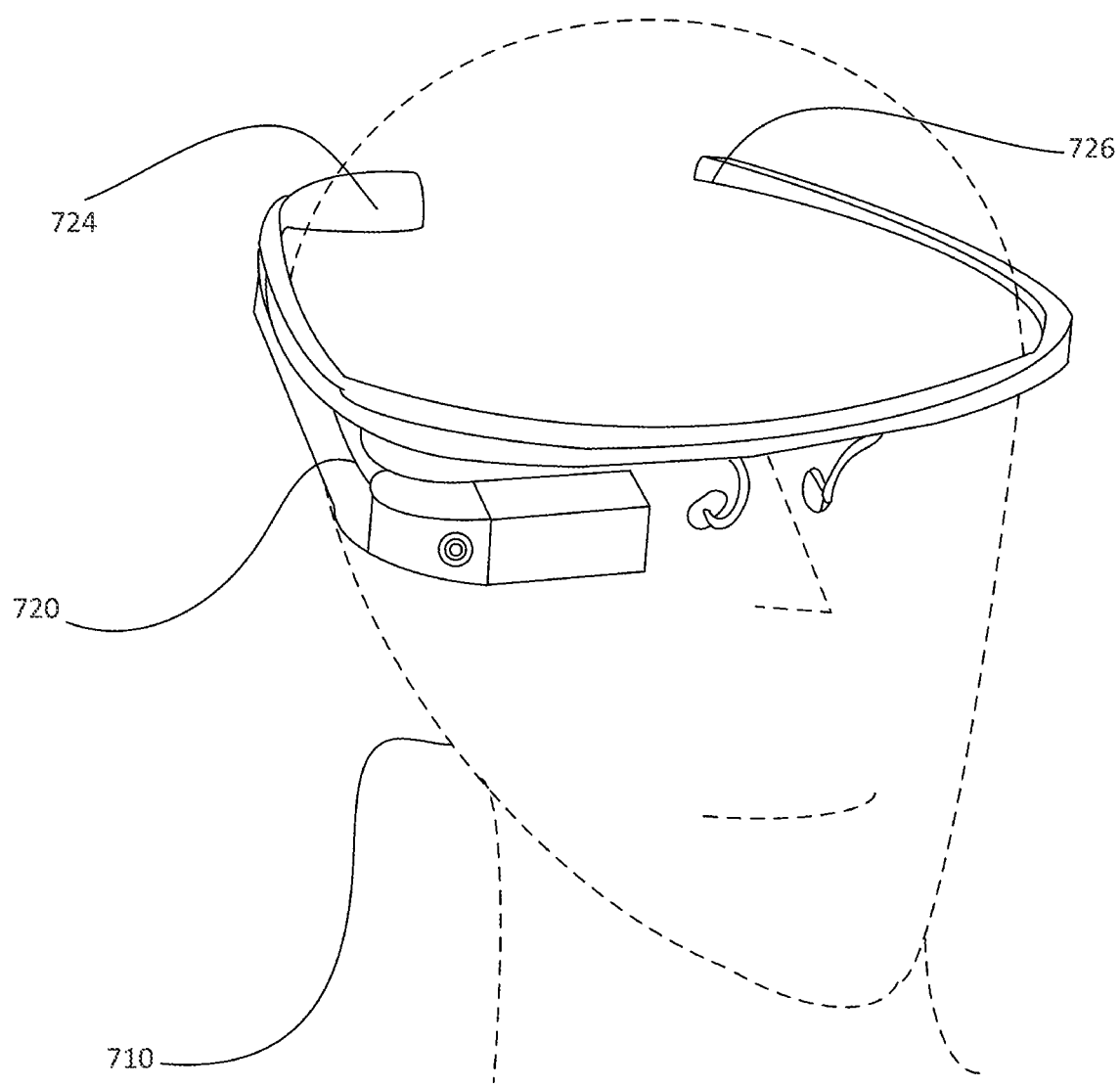
FIG. 7 shows an example illustration of computing eyewear, according to an implementation of the disclosed subject matter.

The arrangement may determine whether a wearable computing device is worn or likely worn by a user by using any applicable sensor such as a capacitance sensor, a skin conductance sensor, an accelerometer, a microprocessor device, a biometric sensor (e.g., a heartbeat monitor), a light sensor, motion sensor, or the like. A capacitance sensor may be used to detect an electrical capacitance and may be located on the wearable computing device such that it is able to detect capacitance on a human body when the device is worn. As an example, as shown in FIG. 5, a wrist watch 500 may contain a capacitance sensor on the back side 510 such that when a user wears the wrist watch, the capacitance sensor is able to detect a capacitance from the user's body. The arrangement may determine that a user is wearing or likely wearing a wearable computing device when the capacitance sensor registers a threshold capacitance value and that a user is not wearing or not likely wearing the device absent a registered threshold capacitance value. As another example, as shown in FIG. 7, the arrangement may determine that a user 710 is wearing or likely wearing eyewear 720 based on a capacitance reading obtained by either eyewear component 724 or 726.

Similarly, a skin conductance (e.g., a galvanic skin response, electrodermal response, psychogalvanic reflex, skin conductance response, skin conductance level, etc.) may be measured using any applicable component. The arrangement may determine whether a user is wearing or likely wearing a wearable computing device based on a threshold conductance value. Similarly, a biometric sensor may gather any applicable biometric data such as a heartbeat, physical pattern (e.g., iris pattern, retina patter, facial pattern, etc.) electric field, magnetic field, odor, sound, or the like. As an example, a wearable computing device may contain a sensor that can detect an electric field generally generated by humans and may be configured to detect an electric filed passing through at least a portion of the device. The arrangement may determine whether a user is wearing or likely wearing a wearable computing device based on detecting the electrical field. A light sensor may detect any applicable light based attribute such as brightness, intensity, luminance, color, or the like.

According to an implementation, the arrangement may determine whether a wearable computing device is worn by a user based on a single sensor and/or attribute or based on a combination of sensors and/or attributes. A combination of sensors and/or attributes may provide a more robust result as they may enable the arrangement to apply multiple data values to determine whether a user is wearing or likely wearing wearable computing device. As an example, the arrangement may determine that a wearable computing device is not worn by a user if a motion sensor located within the device has not reported a threshold amount of movement within 15 minutes and if the light sensor detects a luminance value of below 3 cd/m$^2$. As another example, the arrangement may determine that a wearable computing device is worn by a user if a threshold skin conductance amount is detected by a sensor as well as if a motion sensor has detected movement within the past 20 minutes.

According to an implementation of the disclosed subject matter, at step 310 in FIG. 3, the arrangement may determine that a wearable computing device is worn or likely worn by a user. Based on the determination, as shown at step 320, the wearable computing device may be operated in a private mode. The private mode may be associated with elements such as data, data types, configurations, and the like. At step 330, the wearable computing device may receive, transmit and/or provide data to a user that the device in another mode (e.g., public mode) does not. The data may be identified as private data by the wearable computing device or by another electronic device, as disclosed herein. The data may be private such that a user may not intend to distribute the type of data publically or allow another user to view the data. As an example, the wearable computing device may receive a user setting and, based on the user setting, may display the user's work related calendar events only when the device is in a private mode. The user setting may be input via the wearable computing device or an external device, as disclosed herein. The arrangement may be configured such that a data type is only received, transmitted and/or provided by the wearable computing device while the device is in a private mode. The data type may be one such that a user may not intend to distribute the type of data publically or allow another user to view the type of data. As an example, a watch operating in a private mode may receive banking alerts from a user's banking service and provide the banking alerts to a user via a display on the watch only when the watch is operating in a private mode. Alternatively or in addition, the data type may be one such that receiving, transmitting, and or providing the data type by the wearable computing device would be inefficient unless the device is operating in a private mode. A data type may be inefficient for any applicable reason such as for battery consumption, for providing non-applicable information, or the like. As an example, a wearable computing device may display email alerts via a display screen only while the device is in a private operating mode as if the device is in a public mode, it is likely that the device is not worn by a user and, thus, the alerts will not be useful to a user. Further, providing the alerts may consume additional battery power in comparison to not providing the alerts and, thus, the alerts may only be provided to the user while the device is in a private mode (e.g., while it is worn or likely worn by a user) and not while it is in a public mode, to reduce battery consumption. Either the wearable computing device or an electronic device may determine whether a data, data type, or configuration is private (e.g., secure, personal, inefficient, etc.), as disclosed herein.

A wearable computing device operating in a private mode may be configured differently than the device operating in another mode (e.g., a public mode). The configuration may apply any applicable property such as a brightness (e.g., the display may operate at a higher brightness), frequency of an event (e.g., more frequent message alerts, more frequent reminders, more frequent notifications, etc.), providing data for a type of event (e.g., private messages, private data, data useful while a device is worn by a user, etc.), communicating with an electronic device (e.g., communicating with a mobile phone, tablet, computer, server, etc.), or the like. A wearable computing device may have access to a user account, such as an email account, banking account, social media account, purchasing account, media account, or the like, and may receive, transmit, and/or provide data to a user based on the user account while in a private mode. As an example, a first user's watch may operate in a private mode and the first user may receive an alert that a second user has requested the first user to join the second user's social network. The first user may be able to accept, reject, or ignore the request by interacting with a touchscreen display on the watch, or by using a voice command or gesture to provide an instruction to the watch. As another example, as shown in FIG. 7, eyewear 720 may have access to a user's contact list and, when in a private mode, may enable a user to communicate with a contact by accessing the user's contact list. According to an implementation of the disclosed subject matter, a wearable computing device may be configured to be tailored to a specific user. For example, a wearable computing device may be configured to be tailored to both a brother and a sister, based on who is using the device. The device may determine which user to tailor the watch to at a specific instance based on an authentication request, as disclosed herein. Accordingly, a wearable computing device operating in a private mode may provide user specific data to a specific user based on determining that the specific user is wearing the device. As an example, a watch may request a user to input a pin-code prior to operating in a private mode. Based on the received pin-code, the watch may determine that user two of three potential users is wearing or likely wearing the watch and, accordingly, may provide information (e.g., email updates) that correspond to user two of three.

According to an implementation of the disclosed subject matter, at step 340 in FIG. 3, the arrangement may determine that a wearable computing device is not worn or likely not worn by a user. Based on the determination, as shown at step 350, the wearable computing device may be operated in a public mode. The public mode may be associated with elements such as data, data types, configurations, and the like. At step 360, while operating in the public mode, the wearable computing device may receive, transmit and/or provide data to a user that is not considered private, secure, or inefficient (e.g., data that is unlikely to be viewed by user, data that requires more battery to be used than would be efficient for an unworn device, etc.). The data may be identified as public data by the wearable computing device or by an electronic device, as disclosed herein. The data may be public such that a user may intend the data to be made available to anyone that is proximate to the wearable computing device. As an example, the wearable computing device may display a current time, date, or weather while operating in a public mode as the time, date or weather may be applicable to anyone that is proximate to the device. The arrangement may be configured such that a data type is excluded from being received, transmitted and/or provided by the wearable computing device while the device is in a private mode. The data type may be one such that a user may not intend to distribute the type of data publically or allow another user to view the type of data. As an example, a watch operating in a public mode may not receive any banking or personal email alerts that the device may receive while in another mode (e.g., a private mode). Alternatively or in addition, the data type may be one such that receiving, transmitting, and or providing the data type by the wearable computing device would be inefficient while operating in a public mode as it is likely that a user is not wearing the device. A data type may be inefficient for any applicable reason such as for battery consumption, for providing non-applicable information, or the like. As an example, displaying email alerts via a display screen while a device is not worn by a user may compromise the user's privacy as well as consume unnecessary battery power. Thus, email alerts may not be displayed while a wearable device is operating in a public mode. Either the wearable computing device or an electronic device may determine whether a data, data type, or configuration is public (e.g., generic, impersonal, efficient, etc.), as disclosed herein.

A wearable computing device operating in a public mode may be configured differently than the device operating in another mode (e.g., a private mode). The public mode configuration may apply any applicable property such as a brightness (e.g., the display may operate at a lower brightness), frequency of an event (e.g., less frequent or no message alerts, less frequent or no reminders, less frequent or no notifications, etc.), withholding displaying/providing data for a type of event (e.g., private messages, private data, data useful while a device is worn by a user, etc.), not communicating or minimally communicating with an electronic device (e.g., communicating with a mobile phone, tablet, computer, server, etc.), displaying only a specific type of data (e.g., time data), or the like. A wearable computing device with access to a user account, as disclosed herein, may not receive, transmit, and/or provide data to a user based on the user account while in a public mode. As an example, a first user's watch may operate in a public mode and alerts and notifications that may normally be displayed on the watch while in a private mode, may not be displayed. As another example, as shown in FIG. 7, eyewear 720 may generally have access to a user's contact list while in a private mode. However, while in a public mode, the eyewear may not have access to the contact list and, thus, may not initiate respective communication.

According to an implementation of the disclosed subject matter, a wearable computing device may communicate with an electronic device. The electronic device may act as a hub for the wireless computing device and data that is provided to and/or from the wireless computing device. For example, email data that is displayed using a wireless computing device may be provided by an electronic device. Additionally, an electronic device may be used to configure a wireless communication device. For example, a wrist watch may be connected to a user's mobile phone using a Bluetooth connection. The user may instruct the mobile phone to provide the wireless computing device with media stored on the mobile phone. Subsequently, the user may view the media provided by the electronic device on a wireless computing device display screen.

An electronic device may be any applicable device configured to communicate with the wearable computing device such as a mobile phone, a tablet, a laptop computer, a desktop computer, a server, a hard drive, or the like. The electronic device and the wearable computing device may communicate via any applicable connection such as a physical connection, a wired connection, a wireless connection, a Bluetooth connection, a Wifi connection, a network connection, a cellular connection, or the like. An electronic device may communicate with a wearable computing device and provide any applicable data such as communication alerts, communication messages, reminders, data packets, media content, documents, files, advertisements, search results, or the like. A data element request may be transmitted from a wearable computing device to the electronic device or the electronic device may periodically transmit data elements to one or more wearable computing devices. The periodic times may be predetermined, arbitrary, or determined dynamically or based on a rule or setting. Additionally, an electronic device may determine whether specific data or data type is associated with a public or private mode. As an example, a user mobile phone may determine that email messages are secure data and, thus, only provide them to a wearable computing device if the device is in a private mode. Alternatively, the user mobile phone may determine that email messages are secure data and, thus, mark them as secure data such that a wearable computing device may determine, based on the marking, not to display them unless the device is in a private mode. Alternatively, as disclosed herein, the user mobile phone may provide the email messages to a wearable computing device, and the device may determine that the messages are secure and, thus, only provide them to a user while in a private mode. Notably, an electronic device or wearable computing device may determine whether a data element, data type, or configuration should be categorized as private or public.

According to an implementation of the disclosed subject matter, the arrangement may operate a wearable computing device in a given mode based on an electronic device. The mode may be determined based on an electronic device configuration, location, proximity, or the like. As an example, a user may configure an electronic device to disable a wearable computing device from entering a private mode. Specifically, a user may access an application on the electronic device and configure the mode settings for a wearable computing device. As disclosed, the configuration may include a specific mode and may include time or rule based settings. As an example, a user may configure the arrangement such that a wearable computing device is operated in a public mode whenever the user's mobile phone is in placed in a meeting mode. A wearable computing device mode may be modified based on the location of the wearable computing device (e.g., home, work, school, airplane, etc.) and/or on an electronic device location. As an example, the user may configure the arrangement such that a wrist watch enters public mode whenever the user's electronic device is within a conference room. A wearable computing device mode may be modified based on the proximity of an electronic device to one or more other electronic devices and/or to the wearable computing device. As an example, the arrangement may operate the wearable computing device in a public mode if a specified electronic device is not within a threshold proximity to the wearable computing device. It will be understood that a wearable computing device mode may be determined based on a combination of factors such as, for example, the mode may be based on whether a user is likely wearing the wearable computing device as well as on an electronic device configuration.

Figure 6A:
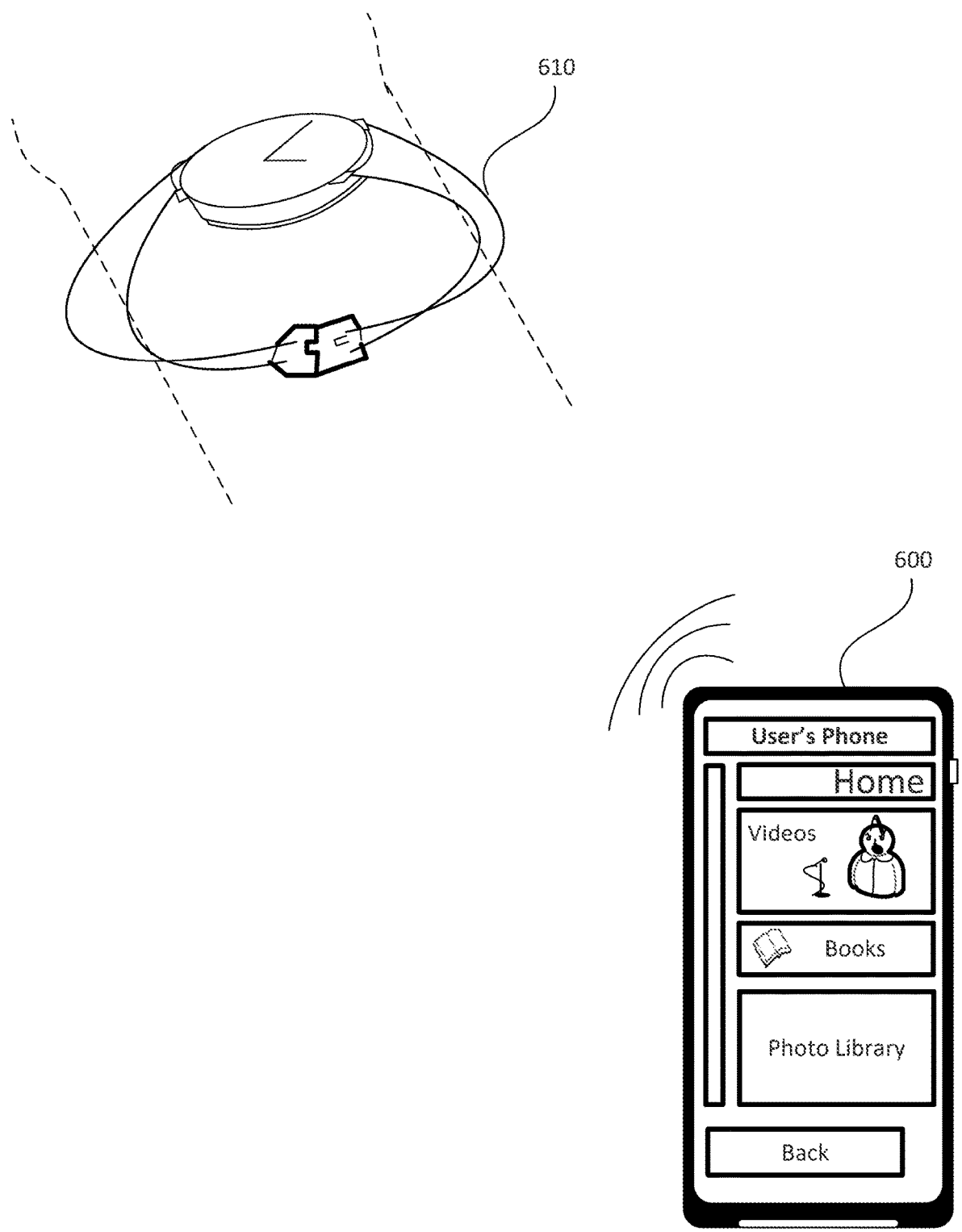
FIG. 6a shows an example illustration of a mobile phone transmitting to a clasped watch, according an implementation of the disclosed subject matter.
Figure 6B:
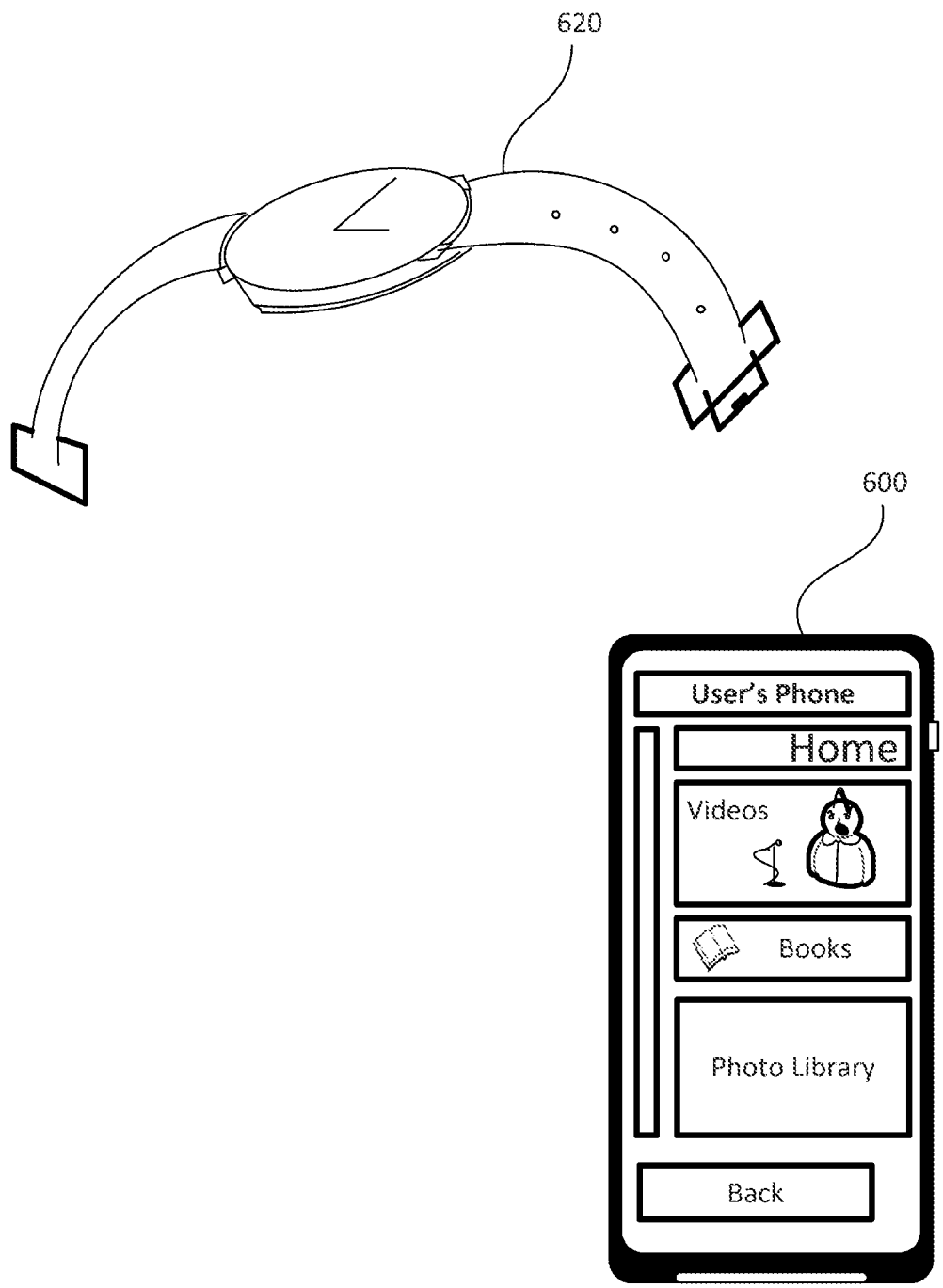
FIG. 6b shows an example illustration of a mobile phone transmitting to an un-clasped, according an implementation of the disclosed subject matter.

An electronic device may be configured to receive from or transfer information to a wearable computing device based on whether it is likely that a user is wearing the wearable computing device or based on the mode the device is operating in. As an illustrative example, as shown in FIG. 6*a*, an electronic device may be provided with information that indicates that the wrist watch 610 is worn or likely worn by a user or that the wrist watch 610 is operating in a private mode. Accordingly, the electronic device may transfer information to the wrist watch 610. Alternatively, as shown in FIG. 6*b*, an electronic device may be provided with information that indicates that the wrist watch 620 is worn or likely worn by a user or that the wrist watch 620 is operating in a private mode. Accordingly, the electronic device may not transfer information to the wrist watch 610.

According to an implementation of the disclosed subject matter, an authentication element may be requested prior to operating a wearable computing device in a private mode. An authentication element may enable the arrangement to verify that access to a private mode via a wearable computing device is only provided to an intended user. An authentication element may be required prior to enabling private mode access on a wearable computing device. The lack of a valid authentication element may cause a wearable computing device to remain in a public mode. For example, the owner of a wrist watch may use the wrist watch to access private mode data upon inputting a user specific pin code into the wearable device. The owner may allow another individual to borrow the wrist watch without providing the other individual access with the user specific pin code and, thus, restricting the other user from being exposed to the private mode data. The authentication element may be any applicable element such as a pin code (e.g., an alphanumeric code, a numeric code, a pattern code, a voice code, etc.), a biometric attribute (e.g., a heartbeat, physical pattern, iris pattern, retina patter, facial pattern, electric field, magnetic field, odor, sound, etc.), a gesture (e.g., a design, a pattern, a touch gesture, a non-touch gesture, etc.), or the like. The arrangement may receive the authentication element in any applicable manner such as via an input on a wearable computing device or electronic device (e.g., touch screen input, hard button input, soft button input, microphone, biometric sensor input, etc.). For example, a wrist watch may enable a user to input a pin code via a touch screen display on the face of the wrist watch. Accordingly, when a user wears the wrist watch, the wrist watch may display a pin code input prompt and enable a user to input a pin code. Upon receiving a valid pin code, the wrist watch may enter a private mode or, upon receiving an invalid pin code or not receiving a pin code, the wrist watch may enter or remain in a public mode.

An authentication element may be required to enter into a private mode upon detecting that a user is wearing or likely wearing a wearable computing device. For example, a user may wear a wrist watch and upon detecting that the user has worn the wrist watch, the user may be prompted to input an authentication element to enable the wrist watch to enter a private mode. Alternatively or in addition, an authentication element may be requested multiple times while a user is wearing or likely wearing the wearable device. For example, a user may wear computing eyewear at the beginning of a day, and continue to wear the computing eyewear throughout the day. The user may be required to input an authentication element two or more times throughout the day in order to maintain operation of the computing eyewear. Multiple requests for authentications may be based on predetermined criteria such as time (e.g., time intervals, times of day, etc.), location (e.g., change of location, presence in a specific location, etc.), or the like. Alternatively, requests for authentication may be based on the data or type of data being accessed while in private mode. For example, a user may input an authentication element to enable a wrist watch to operate in a private mode. Subsequently, while the wrist watch is in the private mode, the user may request access to banking data. The arrangement may require the user to provide the same authentication element or a different authentication element prior to providing the user access to the banking data and/or continuing operation of the wrist watch in the private mode.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
receiving, by a wearable computing device from a user of the wearable computing device, user settings categorizing one or more data types of data associated with the user received from an electronic device as private data;
determining, by the wearable computing device, whether an authentication element associated with the user is received;
operating, by the wearable computing device based on the determining that the authentication element associated with the user is received, in a private mode;
providing for display, by the wearable computing device operating in the private mode, data received from the electronic device categorized as private data based on the user settings;
operating, by the wearable computing device based on the determining that the authentication element associated with the user is not received, in a public mode; and
not providing for display, by the wearable computing device operating in the public mode, data received from the electronic device categorized as private data based on the user settings.

2. The method of claim 1, wherein the authentication element associated with the user includes a gesture of the user wearing the wearable computing device.

3. The method of claim 1, wherein the not providing for display the data received from the electronic device categorized as private data based on the user settings includes blocking an alert for the data received from the electronic device categorized as private data.

4. The method of claim 1, wherein the providing for display the data received from the electronic device categorized as private data based on the user settings includes displaying an alert for the data received from the electronic device categorized as private data.

5. The method of claim 1, wherein the operating in the private mode further includes providing for display contents at a first frequency level, and the operating in the public mode further includes providing for display contents at a second frequency level.

6. The method of claim 1, wherein the operating in the private mode further includes providing for display contents at a first brightness level, and the operating in the public mode further includes providing for display contents at a second brightness level.

7. The method of claim 1, further comprising:
receiving, by the wearable computing device operating in the private mode, data categorized as private data from the electronic device;
not receiving, by the wearable computing device operating in the public mode, data categorized as private data from the electronic device.

8. The method of claim 1, further comprising:
receiving, by the wearable computing device from the user of the wearable computing device, second user settings categorizing one or more data types of data associated with the user received from the electronic device as public data;
providing for display, by the wearable computing device operating in the public mode, data received from the electronic device categorized as public data based on the second user settings.

9. The method of claim 1, further comprising:
determining, by the wearable computing device, that a location of the wearable computing device is a private location, wherein the operating in the private mode is further based on the location of the wearable computing device being a private location.

10. The method of claim 1, further comprising:
determining, by the wearable computing device, that a location of the wearable computing device is a public location, wherein the operating in the public mode is further based on the location of the wearable computing device being a public location.

11. The method of claim 1, further comprising:
determining, by the wearable computing device, that the electronic device is operating in a first mode, wherein the operating the wearable computing device in the private mode is further based on the electronic device operating in the first mode.

12. The method of claim 1, further comprising:
determining, by the wearable computing device, that the electronic device is operating in a second mode, wherein the operating the wearable computing device in the public mode is further based on the electronic device operating in the second mode.

13. The method of claim 12, wherein the second mode is a meeting mode.

14. The method of claim 1, further comprising:
detecting, by the wearable computing device, that the electronic device is within a threshold proximity to the wearable computing device, wherein the operating in the private mode is further based on the detecting that the electronic device is within the threshold proximity.

15. The method of claim 1, further comprising:
detecting, by the wearable computing device, that the wearable computing device is being worn by the user, wherein the operating in the private mode is further based on the detecting that the wearable computing device is being worn by the user.

16. The method of claim 1, wherein the user settings are received through the electronic device.

17. A wearable device, comprising:
a user display; and
one or more processors configured to:
receive, from a user of the wearable device, user settings categorizing one or more data types of data associated with the user received from an electronic device as private data;
determine whether an authentication element associated with the user is received;
operate, based on the determining that the authentication element associated with the user is received, the wearable device in a private mode;
control, while operating the wearable device in the private mode, the user display to display data received from the electronic device categorized as private data based on the user settings;
operate, based on the determining that the authentication element associated with the user is not received, the wearable device in a public mode; and
control, while operating the wearable device in the public mode, the user display not to display data received from the electronic device categorized as private data based on the user settings.

18. The wearable device of claim 17, further comprising:
one or more sensors, the one or more sensors configured to detect a gesture of the user wearing the wearable device as the authentication element associated with the user.

19. The wearable device of claim 17, wherein the one or more processors are further configured to:
control the user display to display contents at a first frequency level while operating the wearable device in a private mode; and
control the user display to display contents at a second frequency level while operating the wearable device in a public mode.

20. The wearable device of claim 17, wherein the one or more processors are further configured to:
determine that a location of the wearable device is a private location, wherein the operating the wearable device in the private mode is further based on the location of the wearable device being a private location.

21. The wearable device of claim 17, wherein the one or more processors are further configured to:
determine that the electronic device is operating in a meeting mode, wherein the operating the wearable device in the public mode is further based on the electronic device operating in the meeting mode.

22. The wearable device of claim 17, wherein the user settings are received through the electronic device.

* * * * *